United States Patent [19]
Stern

[11] Patent Number: 5,900,814
[45] Date of Patent: May 4, 1999

[54] SECURITY/PREVENTION SYSTEM WITH RELATED DEVICE

[76] Inventor: Ivan Stern, Javornik 25, 62390 Ravne Na Koroskem, Slovenia

[21] Appl. No.: 08/647,967

[22] PCT Filed: Dec. 2, 1994

[86] PCT No.: PCT/SI94/00019

§ 371 Date: Jul. 30, 1996

§ 102(e) Date: Jul. 30, 1996

[87] PCT Pub. No.: WO95/15546

PCT Pub. Date: Jun. 8, 1995

[30] Foreign Application Priority Data

Dec. 3, 1993 [SI] Slovenia ............................. P-9300634

[51] Int. Cl.$^6$ ..................................................... G08B 1/08
[52] U.S. Cl. ......................... 340/539; 340/426; 340/905; 340/825.03; 340/825.69; 455/186
[58] Field of Search ............................. 340/995, 825.03, 340/825.69, 905, 539, 426, 932, 425.5; 364/444; 455/186

[56] References Cited

U.S. PATENT DOCUMENTS 5,293,163  3/1994  Kakihara et al. ....................... 340/905

Primary Examiner—Jeffery Hofsass
Assistant Examiner—Daryl C. Pope
Attorney, Agent, or Firm—Abelman, Frayne & Schwab

[57] ABSTRACT

The base of a security/prevention system is an electronic device which has the capability of joining the performance of two functions, i.e. prevention of road accidents and theft protection of vehicles, using the principle of joint use of frequencies, whereby interference with the device's operation is prevented. The invention allows, on the one hand, such application in road traffic prevention in which an electronic security device installed in a vehicle provides passive or active warning of participants in the traffic as to possible momentary dangers requiring quick reaction of the driver. On the other hand, the invention allows such application in road traffic safety in which an electronic security device protects vehicles against theft; the device comprises three base units, i.e. an electronic security device, which is installed in the vehicle and intended for transmitting messages about theft, a pocket receiver, and a network of receiver devices distributed at all locations of importance to the reception of the transmitted messages.

4 Claims, 10 Drawing Sheets

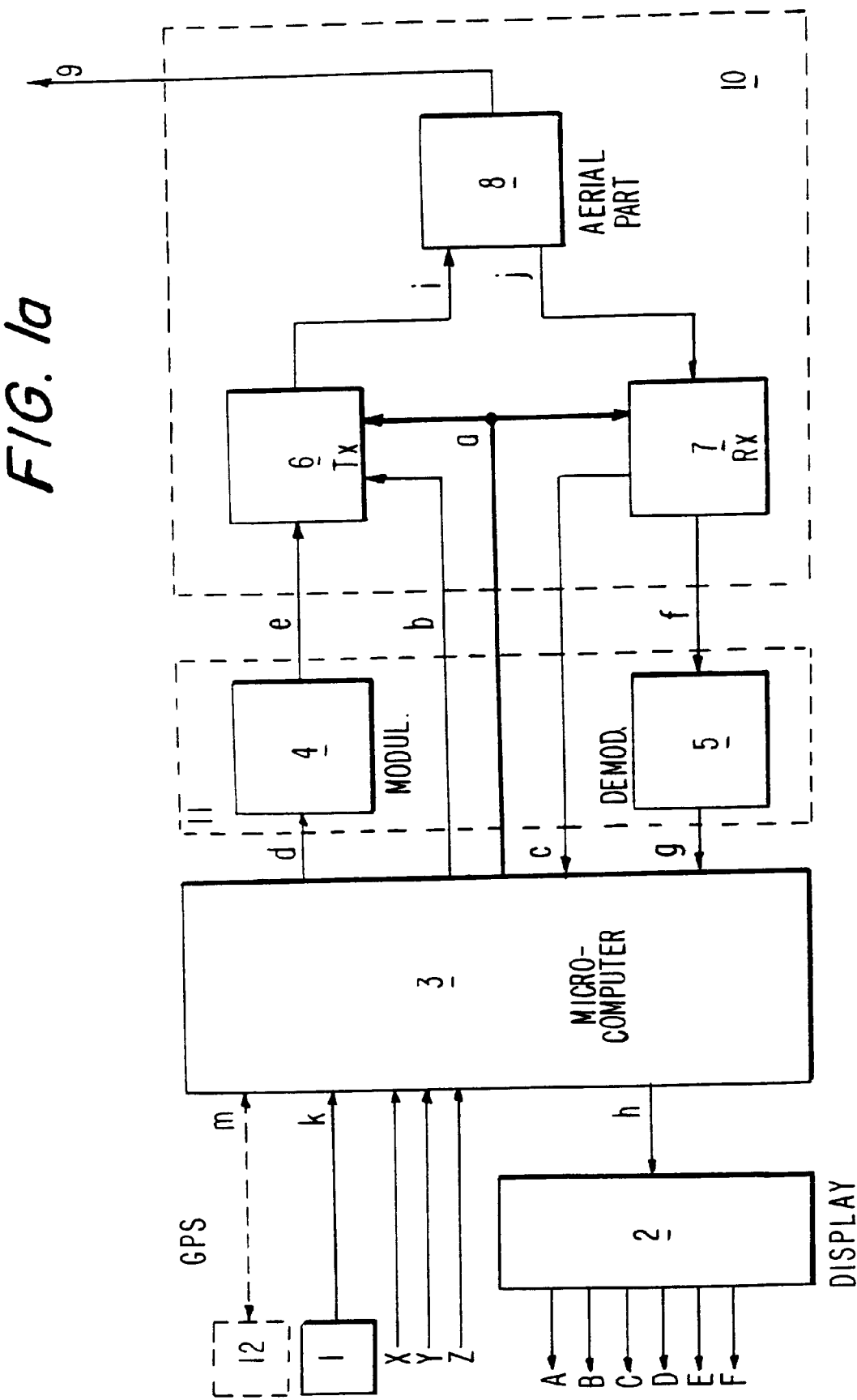

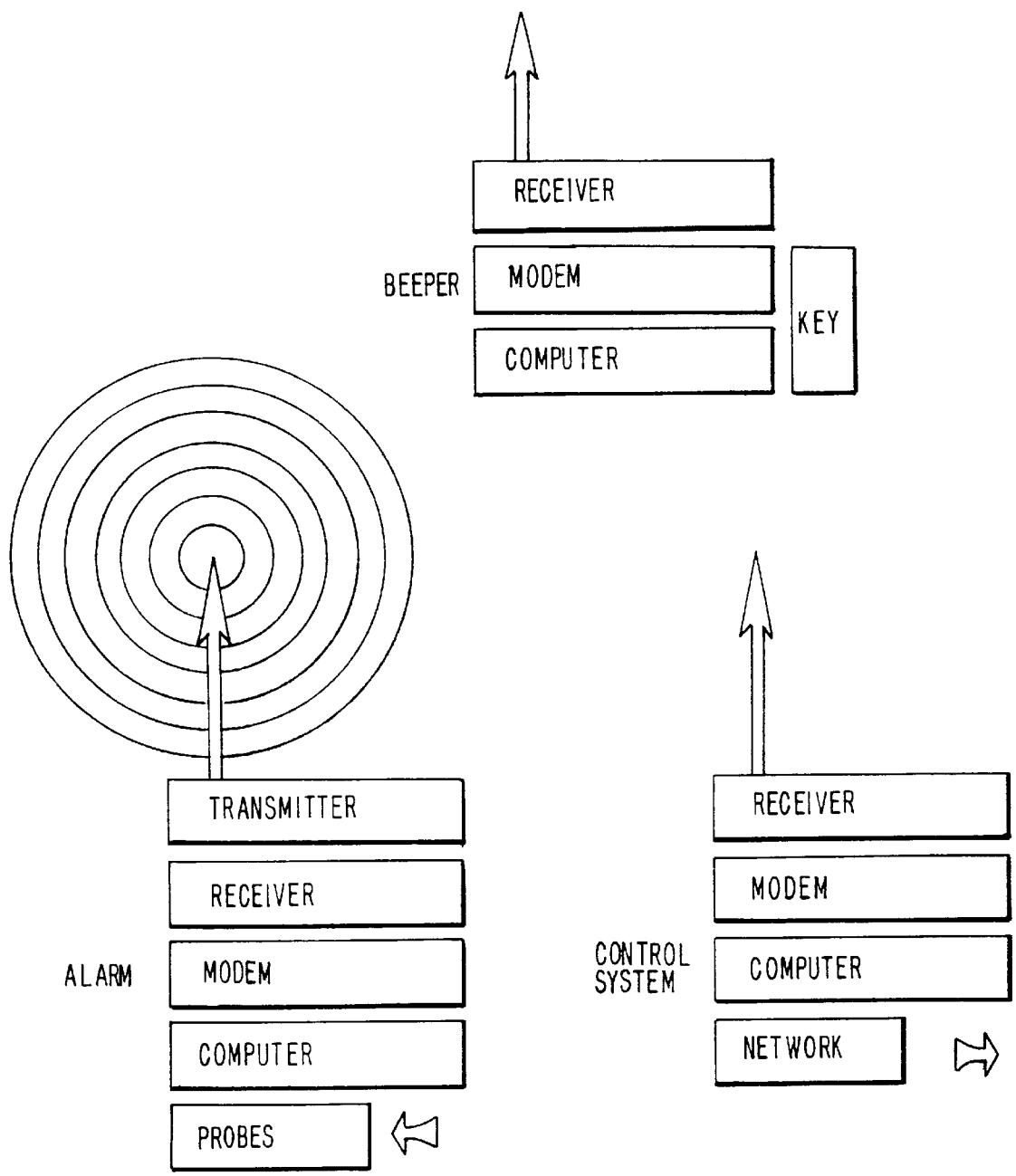

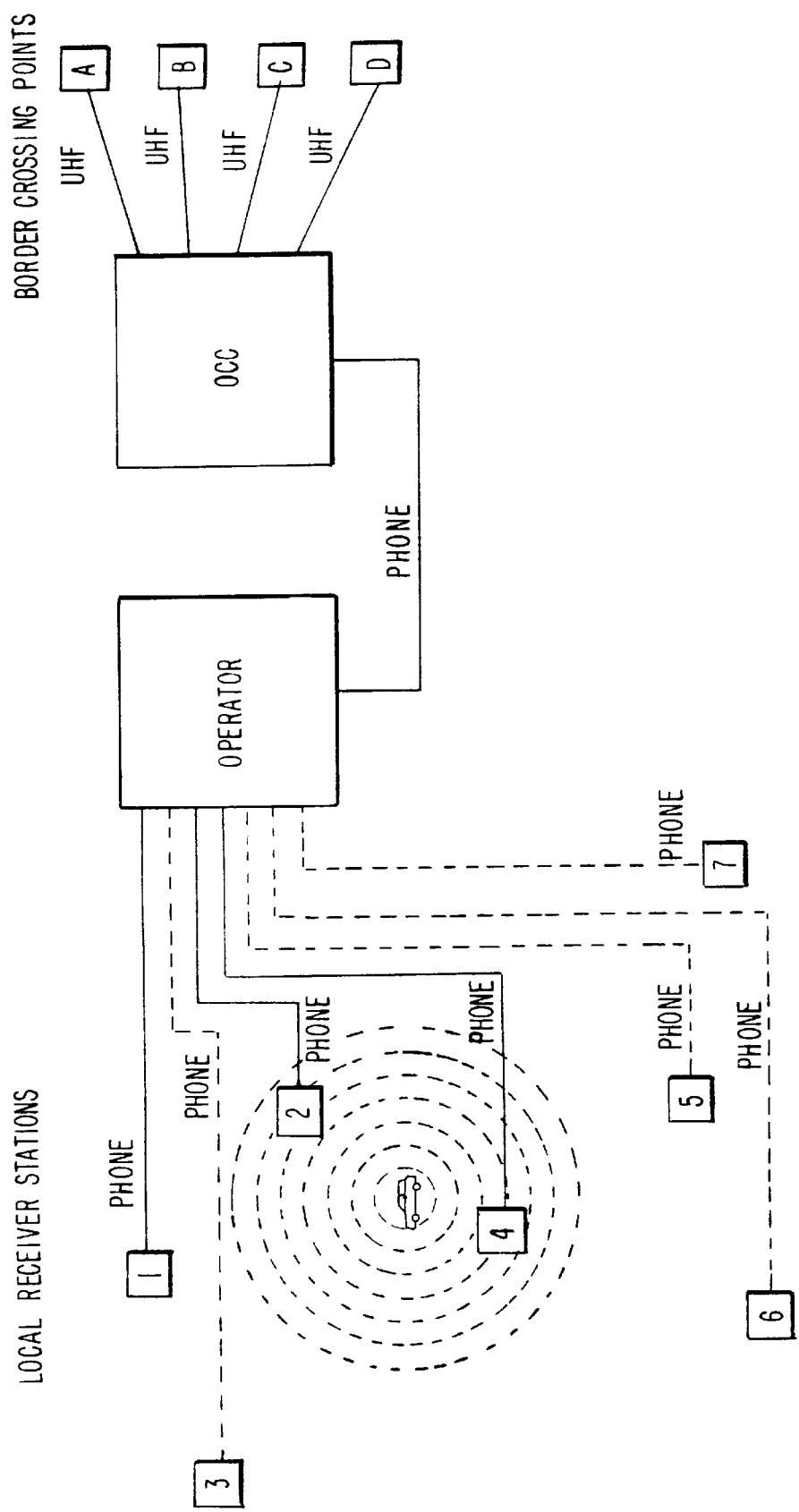

SECURITY/PREVENTION SYSTEM WITH RELATED DEVICE

BACKGROUND OF THE INVENTION

1. Field of the Invention

The base of the security/prevention system is an electronic device which has the capability of joining the performance of two functions, i.e. prevention of road accidents and theft protection of vehicles, using the principle of joint use of frequencies, whereby interference with the device's operation is prevented.

The invention allows, on the one hand, such application in road traffic safety, in which an electronic security device installed in a vehicle provides passive and active warning of participants in the traffic as to momentary dangers requiring quick reaction of the driver.

On the other hand, the device allows such application in road traffic safety, in which an electronic security device protects the vehicles against theft; the device comprises three base units, i.e. an electronic security device, which is installed in the vehicle and intended for transmitting messages about theft, a pocket receiver, and a network of receiver devices distributed at all locations of importance to the reception of the transmitted messages. The invention belongs to classes G01S 5/00, 5/02, 5/14, 3/50, G08G 1/01, 1/09, 1/16, 1/127, G08B 25/01, 25/10 of the International Patent Classification.

2. Description of the Related Art

From the PCT document 91/04081, a system is known for the exchange of information—over RF signals—between stationary stations and moving vehicles. It offers the possibility of changing the data stored in the memory of a device installed in vehicles, while they are moving. The stationary devices trigger the devices installed in the vehicles which are passing by, and get the required data from them. A drawback of this system is the small range of the device.

The PCT document 92/06698 describes bidirectional exchange of data over radio (using one half-duplex frequency) between vehicles and fixed stations which make up a network and which are linked with a center. Interference suppression on the channel is carried out by means of a time-division multiplex and by spread centrum technology. The accent is on the methods of locating the position of a vehicle with respect to the receivers in the network.

In the EP document No. 290 635, a device is described which would prevent collisions of vehicles, especially at crossroads, and also elsewhere on the road. It would provide identification of crashes, even outside the field of vision, by equipping each vehicle with one transmitter and two receivers. The signals would be optical, and the system would provide an additional system for road marking with special signs.

In the EP patent document No. 441 576, a device is described which comprises a transmitter and a receiver part linked into a system with sensors of collision and acceleration. The frequency of the transmitter and the receiver is not specified, and an aerial is provided which is oriented only in the driving direction. The system would be able to make out whether the vehicle approaches or moves away from the transmitter, on the basis of Doppler effect, or on the change of power of the received signal.

The EP document No. 514 996 describes a system of theft protection of vehicles. In the case of theft, the system would emit a code identifying the vehicle. Roadside receiver & coordination stations would receive the code and send it to a centre where the position of the vehicle could be calculated. The system operates at a frequency of 10–15 MHz and 10–15.6 GHz (communication with a satellite). The calculation of the position is made possible by means of the time delay between the signals received at different receiver stations. It also uses a gyroscope.

In the EP document No. 446 985, a system of information within existing RDS system is described, where data are transmitted beside the signal of a commercial radio station. The system provides the breaking down of information by areas. It is evident from the code of a message which area is involved. The receiver is capable of identifying the code and it only receives the desired data. Data are grouped, and each group has its own delay frequency, while the user can select the reception.

In the PCT document No. 90/05349 a system for transmitter position identification is described. The system comprises two parts, i.e. a part which is installed in vehicles and comprises three transmitters and a receiver, and a part which is installed in fixed control centres and has three receivers and a transmitter. The system is based on the principle that each of the three transmitters has its own frequency and a different power. This makes the first transmitter audible within a radius of 50 km, the second within a radius of 25 km, and the third within a radius of 1 km. A control system on a fixed frequency requests the transmission and gives the desired frequency. Depending on the frequency that "hears" it, it defines the distance and transmits the desired data to it.

So far, drivers have only had the possibility of audible (horn or siren) or visual signalling (lights, blinkers or blinking signal lights). Also, in prior art solutions, the given technical problem has not been solved completely and in a complex way, but only partially. There exists, for example, a possibility of calling the driver's attention upon the dangers in traffic over a radio receiver, however, only for certain types of traffic information (road-blocks, hold-ups or traffic jams, queues, slippery road, fog . . . ). For momentary dangers, every driver may find himself in, however, this way of alerting is not sufficient. A similar situation is that with vehicles on urgent ride, which only alert by blowing the horn, and are often not heard by the participants in traffic, or they are heard only at a place where it is impossible to give way.

SUMMARY OF THE INVENTION

The device according to the invention allows the transmission of RF signals which identify the actual state of a vehicle (e.g. sudden braking or acceleration, sudden stop as a result of crash, and similar), and the reception of signals containing important information on the actual state of other vehicles taking part in the traffic (e.g. accident, sudden braking, unexpected barriers). In this way, the device provides active or passive warning of participants in the traffic about direct hazards, giving the drivers more time for perception or reaction (prevents collisions or chain crashes on unsurveyable road sections or in bad weather conditions, clashes against broken down vehicles or unmarked vehicles . . . ).

The device and/or system can also be used for calling attention to vehicles on an urgent ride. The latter should have their device equipped with additional software allowing manual switching of signalling in case of an urgent ride. Similarly, the device can be used by road maintenance vehicles or slow vehicles, or by trains, which can use this device for signalling at unprotected level crossings. Also the sites of works on the road can be equipped with the device for better safety.

A higher version of the device can also be used for automatic switching on and off the lights in tunnels or in bad weather conditions, or at poor visibility, for signalling at incorrect positioning of drivers on motorways.

Tests on the nature of RF signals have shown that the recommendable frequencies are between 400 and 500 MHz, although frequencies in the megahertz range may also be used if necessary. At these frequencies, covering of "shadows" or propagation around corners is almost ideal. At low powers around 100 mW, the range of signals necessary for satisfactory operation of the device should be around 200 to 300 m, which is very suitable for application. A longer range would cause saturation of signals, so that also drivers who are too far away to be in danger would be alerted.

In international use, two problems should be considered, i.e. the different permitted frequencies, and different traffic densities or types. Great traffic densities may bring about saturation of signals, which would become disturbing and give a counter-effect. A means for preventing saturation with alarm signals is low power of transmitter signals, which results in a smaller number of vehicles receiving the signal. An important additional feature for the prevention of "insignificant" signalling is the encoding or selecting the received signals. With the aid of adequate roadside infrastructure—specific code or frequency transmitters—the vehicle is tuned in at individual road section. This means that, while a vehicle is driving past an encoded transmitter, the device in the vehicle receives the information at which frequency it should receive or transmit signals or a digital code with which all the transmitted or received signal should be equipped, and which the device should then communicate to the driver. In this way the device in the car automatically selects the received signals and communicates only the relevant warnings to the driver.

A more convenient way is that of changing frequencies, as this lowers the occupancy of the used frequency channel, which is heavily charged in the encoding system. Additional help is provided by the "weighting factor" of individual warning information, which defines the length of pause between individual transmitted information packages. Thus, absolute priority and the shortest pause between transmissions should be assigned to the signal of collision, while the next in priority would be the signal of strong braking, follow the signals of general danger on the road, or those calling attention upon vehicles on urgent ride.

BRIEF DESCRIPTION OF THE DRAWINGS

FIG. 1a is a block diagram of a transmitter device which is part of the invention.

FIG. 4 is a schematic block diagram of the transmitter device, the receiver station, and the portable receiver.

FIGS. 5a and 5b are schematic illustrations of networks employing the invention to recover stolen vehicles.

DESCRIPTION OF THE PREFERRED EMBODIMENT(S)

The device consists of a microcomputer with an I/O module, a modem, a transceiver station, a digital speed sensor, and additionally also a power sensor, a display, a speaker, and an additional key for manual switch-on in the event of local danger on the road, as shown in FIG. 1.

Figure 2:
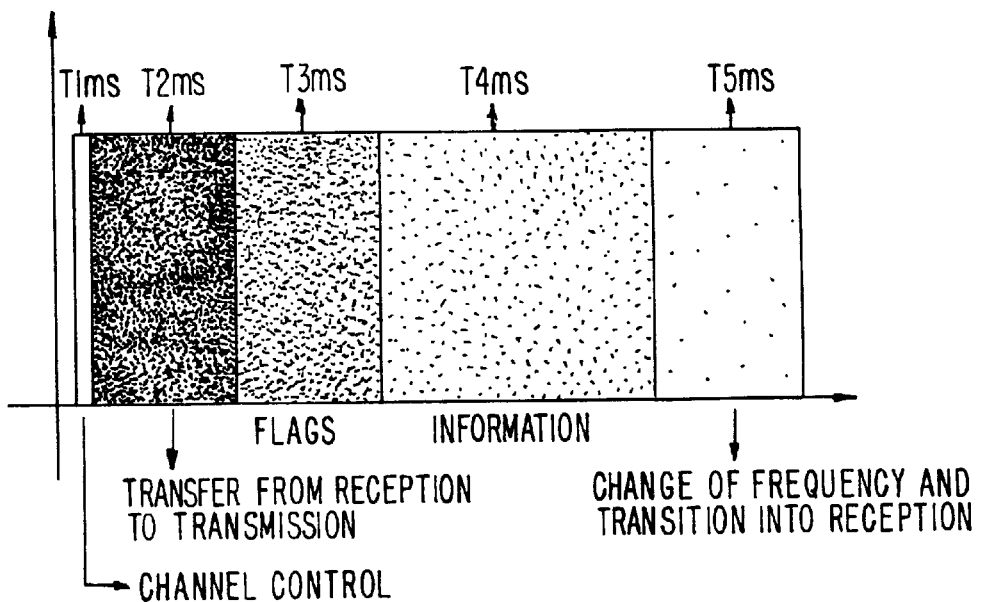
FIG. 2 is a timing diagram showing transmission of a typical signal from the transmitter device.

Through continuous monitoring of the digital speed sensor, the microcomputer constantly updates or calculates momentary accelerations or deceleration of the vehicle. In the case of sudden braking or collision of the vehicle, the sensor senses the drop of speed which brings about the decision to transmit an alarm signal. Signals are transmitted in digital form in short information packages containing besides protocol symbols also information on the type of danger, as shown in FIG. 2.

When there is no priority signal of collision of some other vehicle at the receiver station, the device starts transmitting in intervals over the modem by means of an RF transmitter, digital information packages on sudden braking of the vehicle. This happens independently of the driver, whose attention upon the transmission of his device is called by an acoustic signal or visibly, on his display. The transmission of a signal can be interrupted manually, if the driver considers it appropriate, or automatically, after a certain time delay. The RF receiver station in another car located in a radius of up to approximately 300 m communicates this package via modem to its own microcomputer. This reads the digital information and at the same time activates the acoustic signal and the related light symbol on the display. The received signal lasts as long as it is transmitted by the source, unless the driver interrupts it manually.

In the event of accident—collision—there is no automatic switch-off of signal transmission, only manual. In this way the alarm lasts until the driver himself or somebody else is capable of switching off the device. When—after a certain period of time—the transmission of signal of accident is not manually switched off, the transmission rate is automatically switched to a higher level, making the signal audible at a greater distance. In this way the search for victims in more secluded and less frequent roads is made possible.

The device operates in the mono mode on one or more own channels, otherwise it would not operate in case the channel were occupied by an undedicated user; in different countries, different channels may be used which are automatically adjusted at entering the country (throughout the country, and at border passing points, the roadside infrastructure should transmit information as to which channels the device should be tuned).

The main parts of the device are a microcomputer 3, a modem 11, a high-frequency part 10 and periphery 1, 2 and 12. The microcomputer controls what is going on in the periphery (sensors) and, if necessary, activates the transmitter—sends a signal, and at the same time checks the receiving radio channel—should it happen to receive a signal from the device in some other vehicle.

In the event of passing into other frequency ranges or channels at which the device should operate in individual countries, it is given the information on the change of frequencies over an aerial 9 or an aerial part 8, so that over communication j via the receiver 7, and then over communication f, a signal is received by the demodulator 5 which this communicates to the microcomputer 3 over communication g. Over communication a the microcomputer 3 tunes the receiver 7 and the transmitter 6 to the frequency or the working channel of the device.

All possible states of sensors X, Y, Z—or more, are uniformly encoded in a digital code appropriate for transmission over a HF channel. The digital code is produced by the microcomputer 3 and communicated over communication d via the modulator 4 over communication e to the HF transmitter 6, and this sends the code in the useful part of the signal over communication i via the aerial part 8 or the aerial 9 into the air, allowing in this way the reception by other equivalent devices in other vehicles. The priority of the communicated information is provided in the device by means of adjustable time between two transmissions, and in order to prevent interference between the codes of the same priority a random delay is added to this time. Should the microcomputer in the period between two transmissions sense an optional signal from another device, it starts counting the time from the beginning, and does not transmit the code/signal. In this way it does not interfere with the codes/signals of a higher priority, while two codes of the same priority interchange the channel at random.

In the case of an installed GPS device 12, the microcomputer may, over communication m, at any moment recognize the actual or at least the last measured absolute location of the vehicle, which in the event of crash allows it to transmit—after a certain time, if the transmission of signal is not manually interrupted—also the measured actual location of the vehicle.

The microcomputer 3 processes the received digital codes/signals from other devices and communicates them to the driver over communication h by means of the periphery, i.e. the display 2 with outputs A, B, . . . , F.

Figure 3:
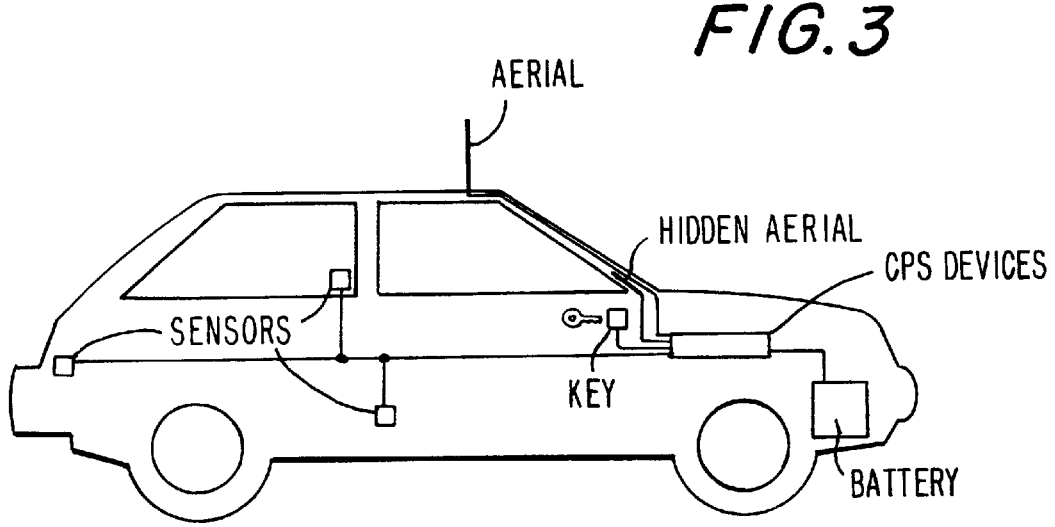
FIG. 3 is a schematic illustration showing a possible installation of the transmitter device in a vehicle.

Considered from the aspect of theft protection, the invention comprises three base units, i.e. an electronic security device installed into the vehicle (possible installation is schematically illustrated in FIG. 3) and intended for transmitting messages on vehicle theft, a pocket receiver, and a network of receivers installed at all places important for the reception of transmitted messages. A schematic block diagram of the three basic units is shown in FIG. 4.

Vehicles are fitted with an electronic device (which may be installed at a place unknown to the driver) which is, in the case of theft. autonomously and immediately activated and starts transmitting a specific digital RF signal containing the essential data of the vehicle—the make, the year of production and the colour, the registration number and the engine or chassis number. In specially equipped vehicles, the alarm signal transmitter may also transmit the actual speed of the vehicle and even its actual coordinates (this is made possible by an incorporated GPS system). The average range of the alarm signal is within a radius of approximately 20 km.

Figure 5A:
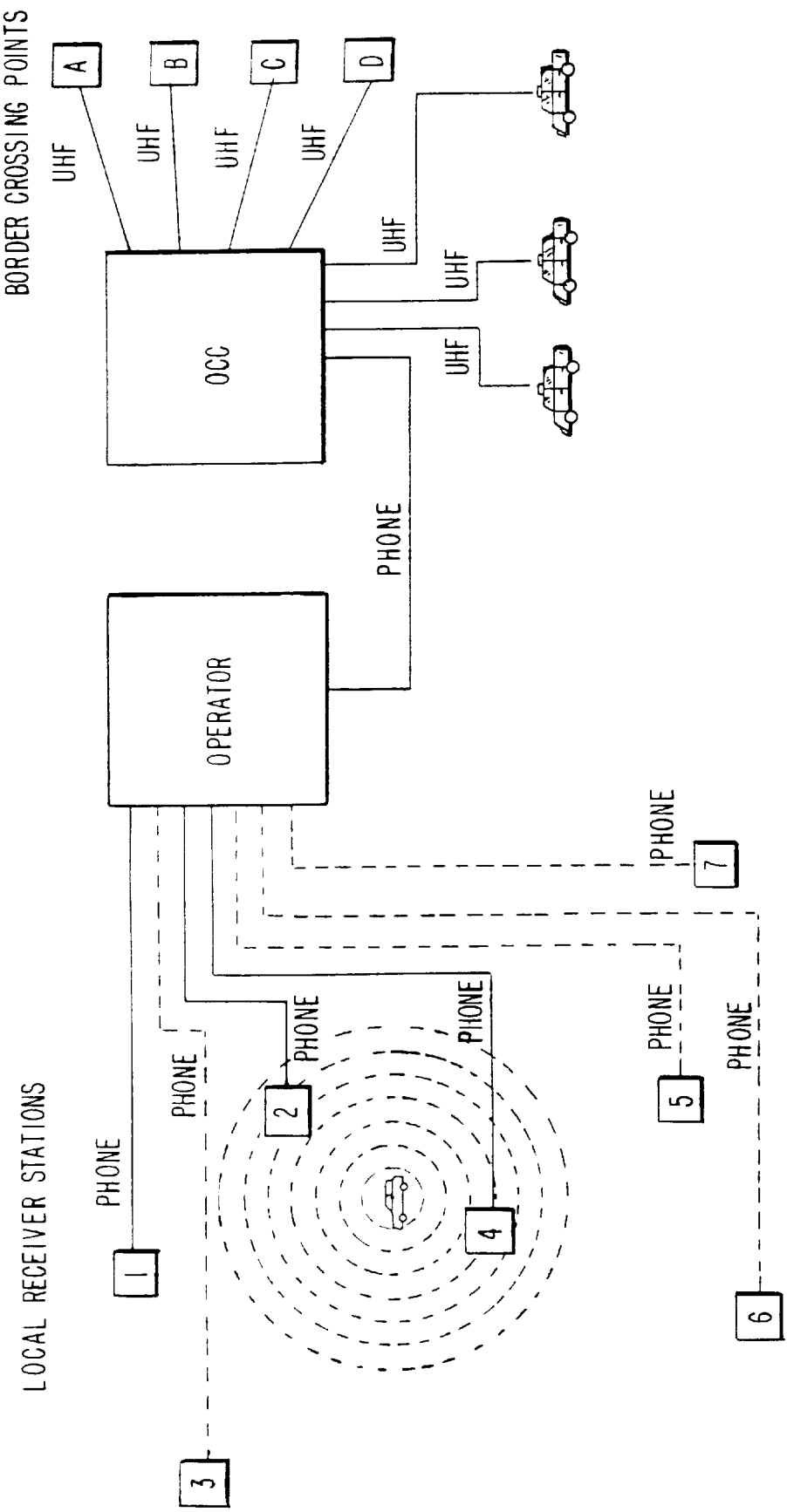

The receivers of these signals must be installed at appropriate locations along the road (an analysis has shown that the ideal locations are at petrol filling stations, at all border crossing points, and alongside motorways where emergency telephones are located), and on all higher mountain peaks where TV or telecommunication repeaters have been installed. The received alarm signals and their intensities are analyzed by the receivers and communicated to the data collecting centre where a special service sorts them by means of an expert computer system and establishes the location of the stolen vehicle, its direction of movement and speed. The centre then communicates these data to the police or some other security service. The described network is illustrated schematically in FIGS. 5a and 5b.

At the same time, the alarm signal is captured by the pocket receiver that the owner should have on him (allowing him to inform the security service in the event of a false alarm, or to give the location of the vehicle at the time it got stolen). The pocket receiver is at the same time a HW/SW key by means of which the alarm can be switched off or the owner can identify himself to the device in his car, so that the alarm is not activated.

Figure 6:
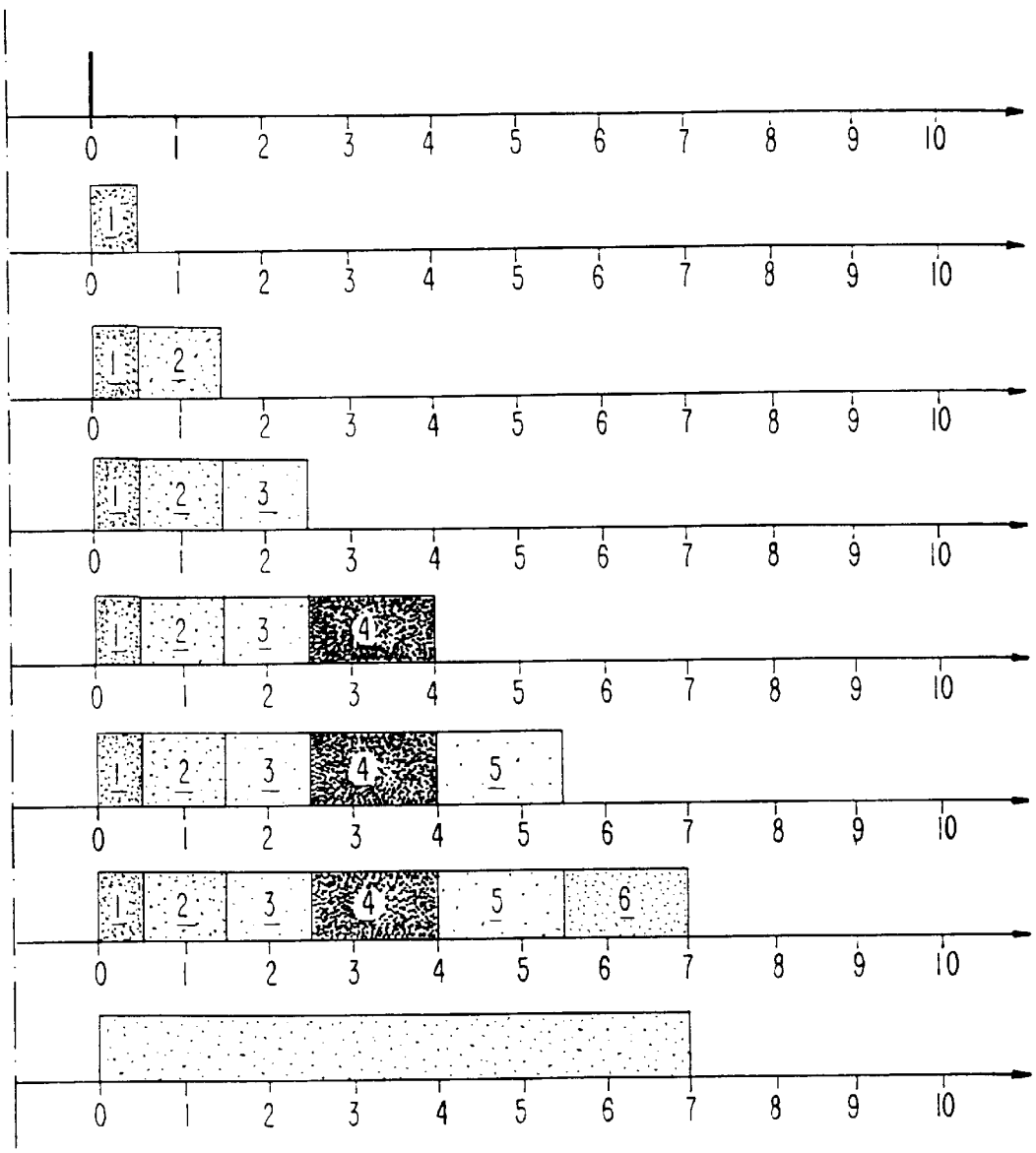
FIG. 6 is a flow chart of alarm communication.

A flowchart of alarm communication is shown in FIG. 6.

The described system has a certain resemblance with the U.S. "Tracker" system which is based on a similar physical principle.

According to the "Tracker" system, cars are equipped with a radio transmitter installed in a hidden place unknown to the driver. When a vehicle gets stolen, the owner alarms a service set up for this purpose by the police. From their centre the police activate, over strong transmitters, the radio transmitter in the stolen vehicle. Then they chase the RF signals from the stolen vehicle by their "chasing" receivers installed in the cars of said service within the police, and indirectly, also the stolen vehicle.

The system has proven more effective than the other known car alarms; still, it has some distinctive drawbacks:

The driver usually finds out late that the vehicle has been stolen (such a system is usually too slow);

A vehicle in motion is practically very hard to be located and caught by the chasers (it is easier when the vehicle is not in motion, but this minimizes the probability of catching the thief);

The system may be interfered with by false or interference signals.

An advantage of the device according to the invention against the "Tracker" system is that the former immediately activates the alarm independently of the owner, and this removes the first drawback and ensures immediate reaction of the police. This considerably increases the reliability of the system.

In addition, the possibility of interfering and thereby preventing the search of vehicles is eliminated, as the system does not need dedicated frequencies for itself, but can co-use a number of frequencies which are available at a certain moment, and otherwise dedicated for other users.

In this way the device can practically not be obstructed in transmitting the alarm signal, as it automatically uses only the free channels, while the interfered channels only mean "occupied" channels which the device cannot use at a given moment. Additional disabling of possible intentional interference of signal transmission is achieved by the mere fact that each subsequent information package is sent over a channel selected at random, which cannot be foreseen.

In the same way operate the receivers which, at slightly longer time intervals, change the receiving channel—again entirely at random—which also disables the interference of the receivers.

Another feature of the system is that it can be used at sea, where the device is especially cost-effective in combination with a GPS.

All similar devices or technical solutions have so far been based on the requirement that they should be easy implement—and thereby also easy to detect. Also, they have not taken into consideration interferences or attempts to prevent detection. The CPS system, however, offers a solution to this problem. The method of co-using free channels is also applicable for sending short digital information for other purposes, as in this way the effectiveness of individual channels is essentially improved.

The system comprises devices installed in vehicles, pocket receivers and receiver stations.

The transmitter device (a block diagram is shown in FIG. 1a) in the vehicles is mainly composed of a microcomputer 3, a modem 11, a HF part 10, communication k to a pocket receiver 1, sensors X, Y and X and possibly a GPS device 12. The microcomputer controls what is going on in the periphery (burglar detecting sensors) and, if necessary, activates the transmitter—sends a HF signal with an information package.

In the event of transition to other frequency ranges or channels at which the GPS device may operate in individual countries, the latter receives information on the changing of frequencies over the aerial 9 or the aerial part 8, so that, over communication j via the receiver 7, and then over communication f, a signal is received by the demodulator 5, which the demodulator 5 sends over communication g to the microcomputer 3. In this way the microcomputer 3 adjusts, via communication a, the working frequency or channel on the receiver 7 and transmitter 6.

All possible states of sensors X, Y and Z—or more—are uniformly defined, and in the event of burglary, they communicate electric signals to the microcomputer 3. All data about the vehicle are uniformly encoded in a digital code, and in the case of activation by the sensors, the microcomputer 3 transmits them over communication d via the modulator 4 over communication e to the HF transmitter 6, and this sends the code in the useful part of the signal over communication 1 via the aerial part 8 or the antenna 9 into the air, and thereby allows the nearest receiver devices to receive it.

If there is a GPS device 12 installed in the vehicle (FIG. 1a), this over communication m provides to the microcomputer 3, at any moment, the information on the position of the vehicle in the space, in absolute coordinates. These coordinates are encoded by the microcomputer 3 and joined to the other useful data stored in the information package which the computer transmits into the air in the event of theft.

In order to suppress interferences in cases of theft of several vehicles, all of which would transmit their information packages, the microcomputer would first select at random one of the permitted frequencies and transmit it over communication a to the receiving part 7 of the HF part 10 of the device and check whether the selected frequency or channel is free. If the the channel is unoccupied—the criterion of signal intensity or validity of digital code—the microcomputer 3 would tune over communication a the receiving part 6 of the HF part to the selected channel, and over communication via the aerial part 8 or the aerial 9 transmit a certain number of digital information packages. Then, after a certain time, it would repeat the procedure. If the channel is busy, the procedure would be repeated, too—another random frequency would be selected and the occupancy of the channel would be checked. The selection of frequencies or channels would be carried out pseudo at random with the correlation that, in a certain time period, each frequency is selected at least once.

Figure 7:
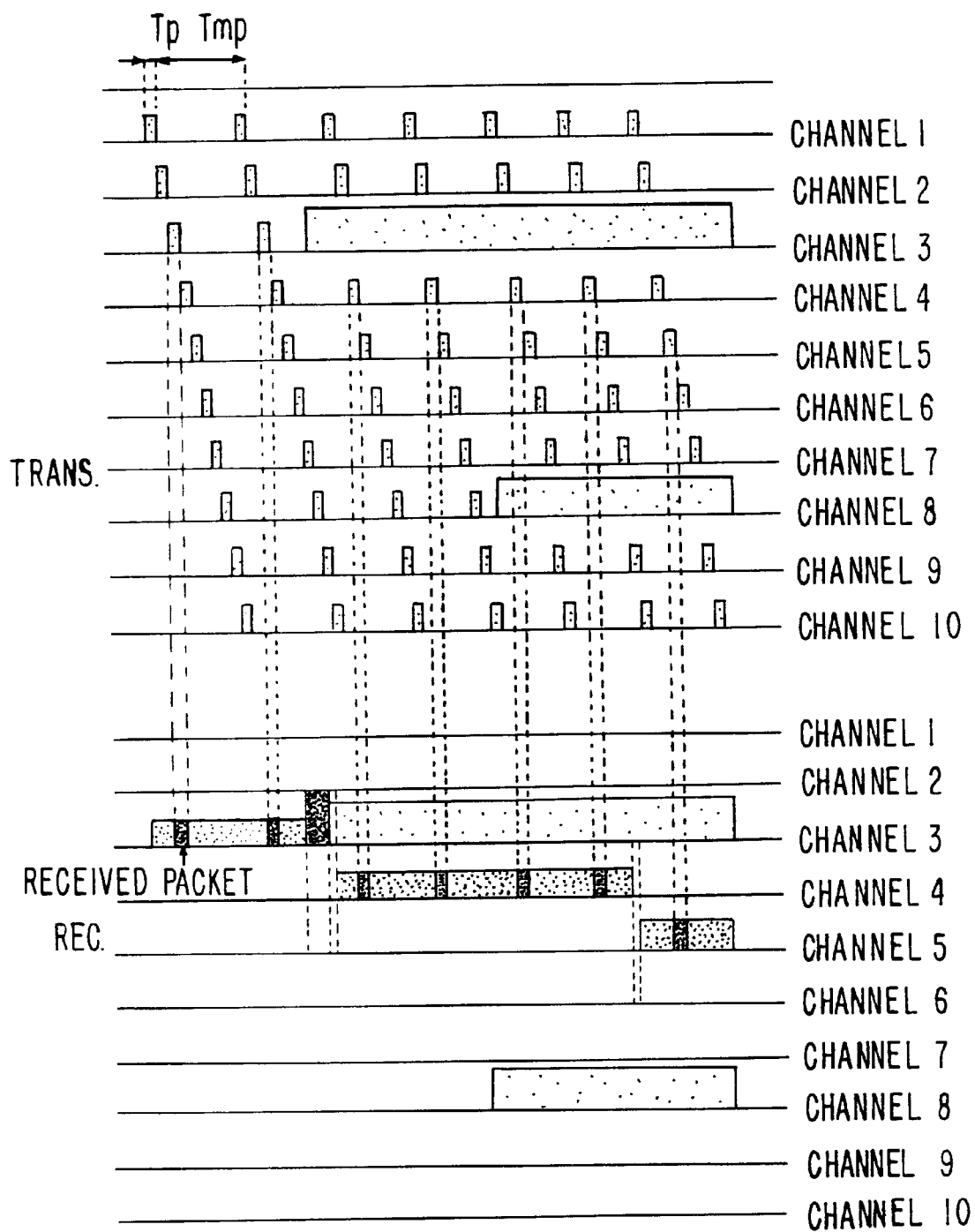
FIG. 7 is a timing diagram of transmission over different channels by a transmitter device and a timing diagram of reception over different channels by a receiver station.

The result of this procedure is that no interferences are caused to other alarm devices or other "regular" channel users, that express interference of transmission of an alarm information package is hindered or practically not possible, as the interfered channel or group of channels is simply skipped by the device; in addition, the transmission frequency is practically unknown. The transmission over different channels in a certain period of time is schematically illustrated in FIG. 7.

The pocket receiver (FIG. 1c) can communicate with the base device installed in the vehicle with the assistance of the microcomputer 3 over communication a via the HW key 1, and can in this way identify itself or prevent the transmission of alarm signals. Also, the microcomputer 3 may over communication by means of a beeper 2 give a sound signal to the vehicle owner that the device in the vehicle is transmitting an alarm signal. This is from the aerial 6 or the receiver 5 over communication via demodulator 4 over communication c recorded in the microcomputer 3 which can then adequately react.

Figure 1B:
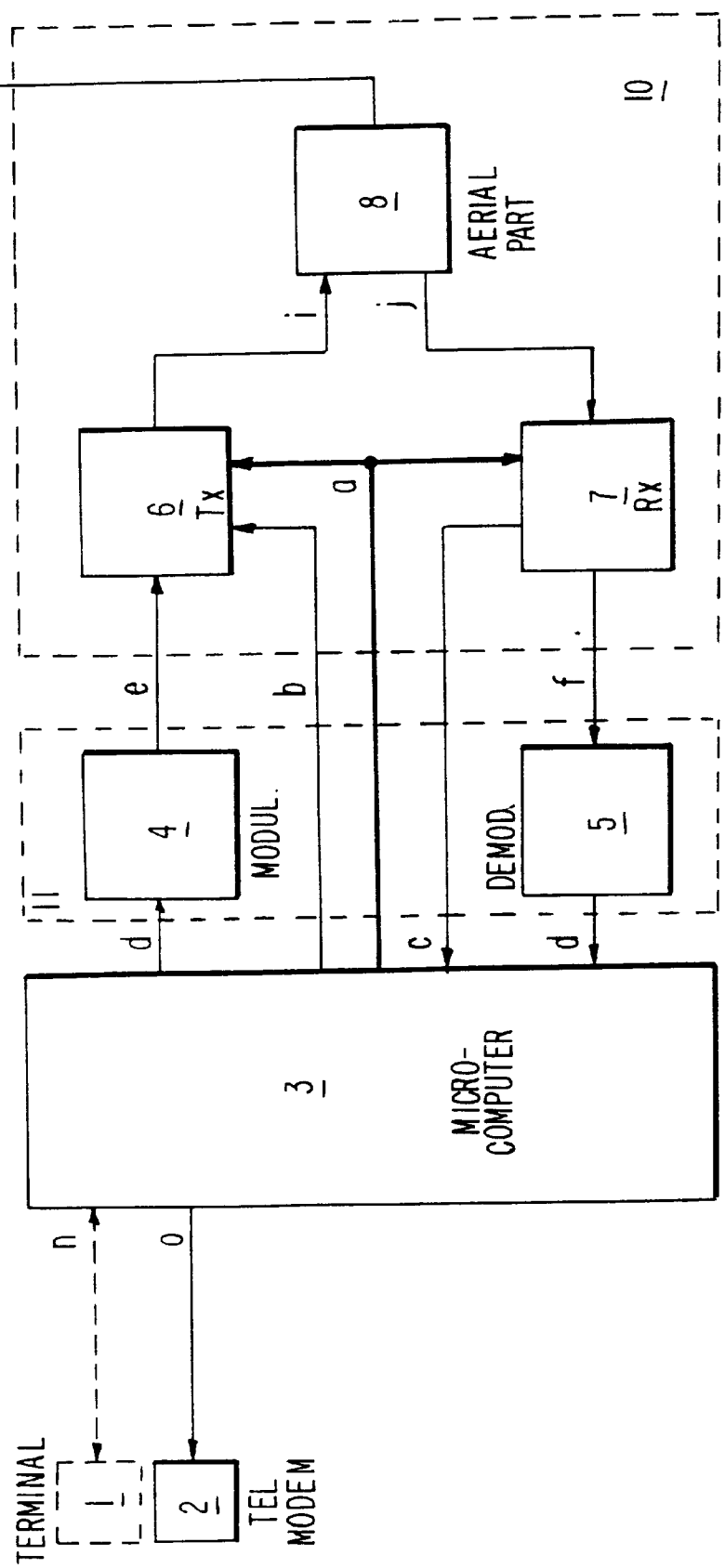
FIG. 1b is a block diagram of a receiver station which is part of the invention.
Figure 1C:
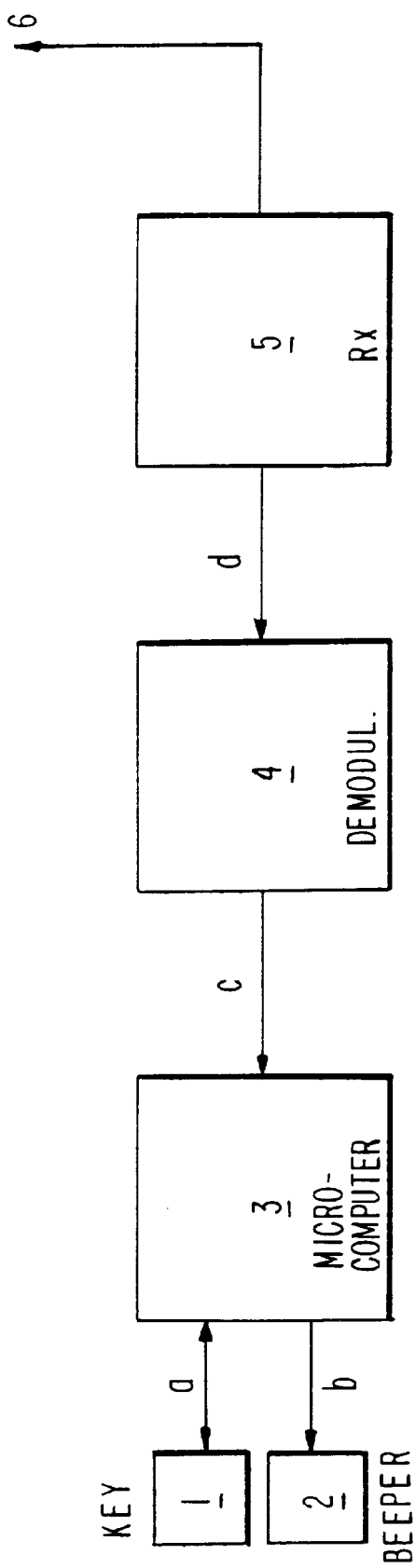
FIG. 1c is a block diagram of a portable receiver which is part of the invention.
Figure 8:
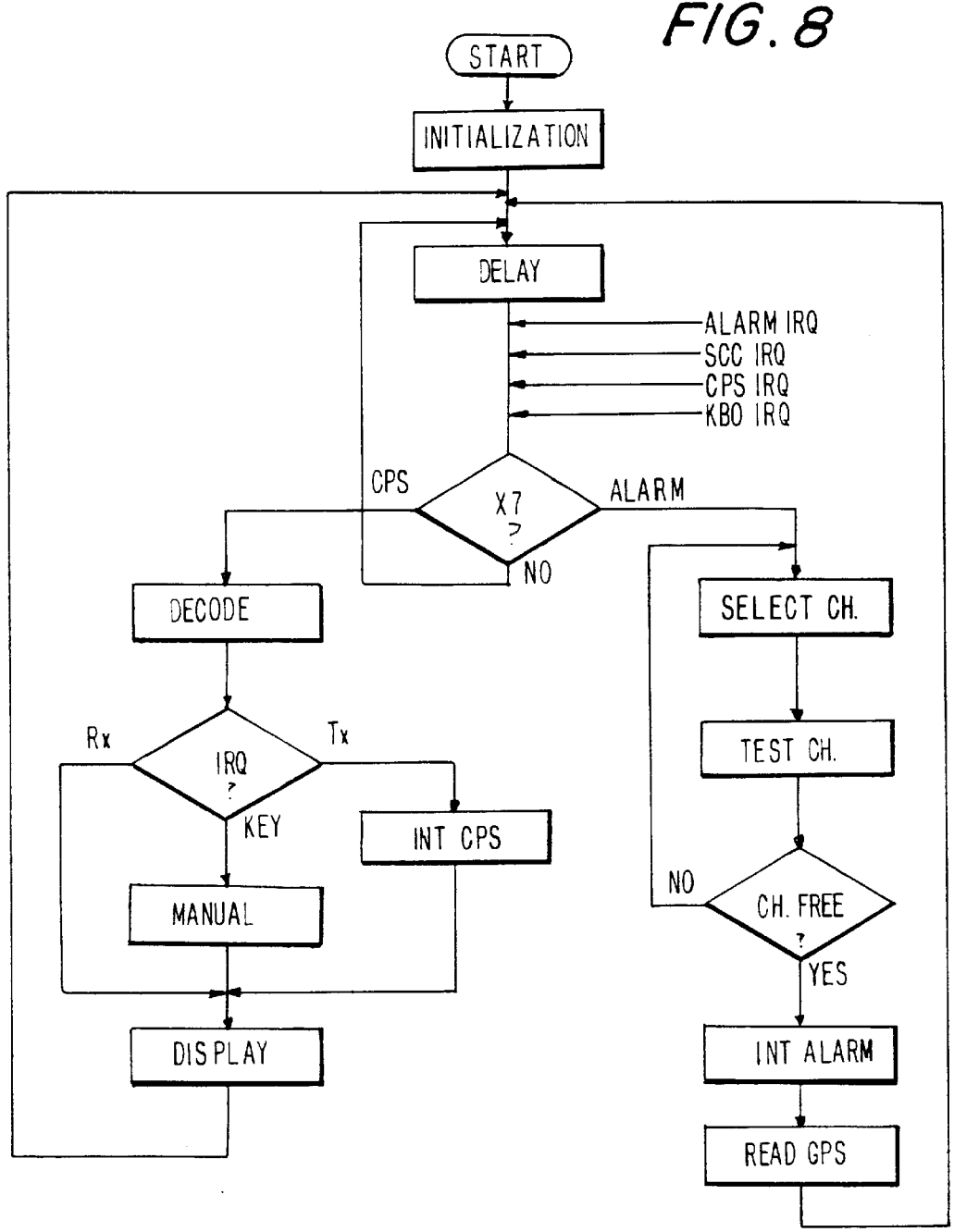
FIG. 8 is a flow chart of operation of the receiver device.

The receiver station in FIG. 1b comprises a microcomputer 3 connected over communication o to a telephone modem 2, a modem 11 and a HF part 10. The receiver device operates in such a way that the microcomputer 3 selects at random one of the permitted frequencies, on which could receive, over the HF part, information packages, and adjusts it over communication a on the receiver 6, then over the aerial 9 or the aerial part 8 over connection j via the receiver 7, over communication f via the demodulator 5 over communication d checks the channel's occupancy. When the channel is occupied by an analogue signal, the microcomputer selects another random channel and again checks its occupancy—the criterion of signal intensity or digital code validity. In the case that the channel is free or occupied by a signal of valid code, which at a definite time contains the specific code of information packages, the computer starts processing the information received. Should the decoder, after a certain lapse of time, not identify the specific code in the signal, or should an analogue signal appear on the channel as a result of interferences (possibly intentional) or of the use of the channel by a "regular" user, the microcomputer 3 will change the receiving frequency to another random frequency of the HF part of the device. Although the reception of information packages on a certain frequency is successful, the receiver or the microcomputer will, after a certain period of time which is longer than or equal to the sum of transmission periods of the transmission device together on all permitted channels, change the receiving frequency of the HF part. This is an additional safety factor which prevents the interference of the receiver device. A time diagram of frequency selecting and changing the carrier frequencies or channels is shown in FIG. 7, while a block diagram of decision making on operation of the device in various cases is shown in FIG. 8.

This procedure ensures that the receiver station will not receive and wait for an alarm information package on a channel which is occupied by a "regular" user, prevents intentional interfering of the reception of an alarm information package, as an interfered channel or a group of interfered channels is simply skipped by the receiver device, and makes the receiving frequency practically unknown.

Once the received information has been equipped with the proper code, this information is sent by the receiver device to the information collection centre. This can be done so that the microcomputer 3 in communication o by means of a telephone modem 2 via a telephone line sends its own identification data and the contents of the received information packages, or it can send them via an HF transmitter part over the air to another receiver station, which sends them by the same way to the next receiver station, or directly over telephone into the information collection centre.

The centre can receive the data or the contents of individual information packages over a receiver station which is directly connected with the central computer, or via telephone lines over telephone modems. The received information is then processed by an expert system and sent to the service in charge of transmission.

In the same way also operate the receiver stations which—at slightly longer time intervals—change the receiving channels, again completely at random, so that the interference of the receiver stations is quite impossible.

Another feature of the system is that it can be used at sea, where the device is especially cost-effective in combination with a GPS.

I claim:

1. A security/prevention system with related device, said device, said device being installed in a vehicle and comprising: a decoder; a microcomputer(3); a high-frequency (HF) part(10); a receiver modulator(4); an aerial part(8); and an aerial(8); said device operating with low-power transmission signals and obtaining the encoding and frequency of transmitted or received alarm signals by means of a roadside infrastructure, said roadside infrastructure comprising specific code and specific transmitters, thereby enabling said vehicle to receive at individual road sections, information on which frequency said device should receive or transmit alarm signals, and information on a digital code into which said alarm signals to be transmitted or received by said device are to be encoded, said device operating in a manner comprising the following features and steps:

a) receiving said alarm signals comprising the steps of:
  1a) selecting and checking the occupancy of a second random channel at a second frequency when a first receiving channel at a first frequency is occupied by an analog signal;
  2a) receiving and processing said alarm signals when said first receiving channel is occupied by said alarm signals which have a valid code as defined by said roadside infrastructure;
  3a) changing the receiving frequency of said HF part (10) by said receiver(70) or said microcomputer(3) after a certain first period of time that the alarm signals are received and processed, said first period of time being at least equal to the sum of transmission times of a transmission device on all receiving channels;
  4a) selecting randomly by said microcomputer(3) a third channel at a third frequency, when said first receiving channel is free of signals for a certain second period of time, or, when after said certain second period of time, said decoder does not identify a specific code into which said alarm signals are encoded, or, when an analog signal appears on said receiving channel as a result of interference or use by another user;
 b) adding a weighting factor to individual digital information packages of alarm information included withing said alarm signal, said weighting factor defining a length of pause between said individual digital information packages; and
 c) transmitting said alarm signals comprising the steps of:
  1c) selecting randomly by said microcomputer(3) one of a group of permitted frequencies corresponding to a selected channel;
  2c) said microcomputer(3) sending said selected frequency by a first communication link(a) to said receiver(7) which checks the status of said selected frequency;
  3c) said microcomputer(3) tuning, by said first communication link(a), said transmitter(6) to said selected frequency, when said selected frequency is unoccupied;
  4c) said microcomputer(3) sending a certain number of digital information packages included within said alarm signals, by a second communication link(d), to said modulator(4);
  5c) said modulator(4) sending said digital information packages, by a third communication link(e), to said transmitter(6);
  6c) said transmitter(6) sending said digital information packages, by a fourth communication link(I), to said aerial part(8) or said aerial(9), which transmits said digital information packages; and
  7c) commencing step 1c after a certain third period of time unless the transmission of said alarm signals is complete.

2. A security/prevention system with related device as claimed in claim 1, wherein the device further comprises related peripheral devices (1,2,12).

3. A security/prevention system with related device as claimed in claim 1, wherein a receiver station of the system comprises: a telephone modem (2); a second microcomputer (3) connected through a fifth communication link (o) with said telephone modem (2); a second modem (11) comprising a demodulator (5); a second high-frequency part (10); a second receiver (7) of said second high-frequency part (10); a second transmitter (6) of said second high-frequency part (10); a second aerial part (8); and a second aerial (9); said second microcomputer (3) selecting at random one of a group of permitted frequencies and, through a sixth communication link (a), tuning said second transmitter (6) and said second receiver (7) to said randomly selected frequency, said second microcomputer (3) then, over said second aerial part (8) or over said second aerial (9), checking the occupancy of said randomly selected frequency by a seventh communication link (j) to said second receiver (7), by an eighth communication link (f) to said demodulator (5), and by a ninth communication link (d) to said second microcomputer (3).

4. A security/prevention system with related device as claimed in claim 1, wherein a pocket receiver of the system comprises: a third microcomputer (3); an HW key (1); a beeper (2); a third aerial (6); a third receiver (5); and a second demodulator (4); said third microcomputer (3) being capable of communicating with said device by a tenth communication link (a) through said HW key (1), said third microcomputer (3) also being capable of alerting an owner of an alarm signal by means of said beeper (2) through an eleventh communication link (b), said alarm signal being recorded in said third microcomputer (3), said alarm signal being received from said third aerial (6) or said third receiver (5) through a twelfth communication link (d) to said second demodulator (4) and a thirteenth communication link (c) to said third microcomputer (3).

* * * * *